United States Patent
Han et al.

(10) Patent No.: US 9,872,282 B2
(45) Date of Patent: *Jan. 16, 2018

(54) PUCCH RESOURCE COMPRESSION FOR EPDCCH IN TDD MODE

(71) Applicant: Intel IP Corporation, Santa Clara, CA (US)

(72) Inventors: Seunghee Han, San Jose, CA (US); Yuan Zhu, Beijing (CN); Xiaogang Chen, Hillsboro, OR (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,404

(22) Filed: Dec. 21, 2016

(65) Prior Publication Data
US 2017/0201977 A1 Jul. 13, 2017

Related U.S. Application Data

(63) Continuation of application No. 14/652,590, filed as application No. PCT/US2013/075830 on Dec. 17, 2013, now Pat. No. 9,532,316.

(Continued)

(51) Int. Cl.
*H04W 52/24* (2009.01)
*H04W 72/04* (2009.01)
(Continued)

(52) U.S. Cl.
CPC ....... *H04W 72/0413* (2013.01); *H04L 1/1861* (2013.01); *H04L 5/0055* (2013.01);
(Continued)

(58) Field of Classification Search
CPC combination set(s) only.
See application file for complete search history.

(56) References Cited

U.S. PATENT DOCUMENTS 8,902,786 B2 * 12/2014 Nam ................. H04W 72/0406
370/252
8,958,379 B2 * 2/2015 He ..................... H04W 52/243
370/252
(Continued)

FOREIGN PATENT DOCUMENTS

CN 105009488 A 10/2015
HK 1216954 A1 12/2016
(Continued)

OTHER PUBLICATIONS

3rd Generation Partnership Project; Technical Specification Group Radio Access Network;Evolved Universal Terrestrial Radio Access (E . . . UTRA); Physical layer procedures (Release 11), Dec. 2012, 160 pages.*

(Continued)

*Primary Examiner* — Mounir Moutaouakil
(74) *Attorney, Agent, or Firm* — Schwegman Lundberg & Woessner, P.A.

(57) ABSTRACT

Techniques are described for compressing the PUCCH resources reserved for acknowledging downlink data transmissions when those resources are implicitly signaled by EPDCCHs that schedule the downlink transmissions in TDD mode. An acknowledgment resource offset field transmitted in the EPDCCH is configured to correspond to one or more values that compress the region in PUCCH resource index space that would otherwise be reserved for the subframes of a bundling window.

12 Claims, 3 Drawing Sheets

Related U.S. Application Data (60) Provisional application No. 61/752,386, filed on Jan. 14, 2013.

(51) Int. Cl.

| | | |
|---|---|---|
| *H04L 1/18* | (2006.01) | |
| *H04L 5/00* | (2006.01) | |
| *H04L 5/14* | (2006.01) | |
| *H04W 28/08* | (2009.01) | |
| *H04L 12/801* | (2013.01) | |
| *H04W 52/28* | (2009.01) | |
| *H04W 28/02* | (2009.01) | |
| *H04W 24/10* | (2009.01) | |
| *H04W 24/02* | (2009.01) | |
| *H04L 12/813* | (2013.01) | |

(52) U.S. Cl.
CPC ............. *H04L 5/14* (2013.01); *H04L 47/12* (2013.01); *H04L 47/20* (2013.01); *H04W 24/02* (2013.01); *H04W 24/10* (2013.01); *H04W 28/0247* (2013.01); *H04W 28/0252* (2013.01); *H04W 28/08* (2013.01); *H04W 52/243* (2013.01); *H04W 52/244* (2013.01); *H04W 52/283* (2013.01); *H04W 72/042* (2013.01); *H04W 72/0446* (2013.01)

(56) References Cited

U.S. PATENT DOCUMENTS

| | | | | |
|---|---|---|---|---|
| 9,191,326 | B2* | 11/2015 | Han | H04W 24/10 |
| 9,191,945 | B2* | 11/2015 | Seo | H04L 1/1861 |
| 9,338,775 | B2* | 5/2016 | Yang | H04L 1/1861 |
| 9,363,803 | B2* | 6/2016 | Seo | H04L 1/1854 |
| 9,369,256 | B2* | 6/2016 | Seo | H04L 1/1861 |
| 9,374,806 | B2* | 6/2016 | Han | H04W 52/0258 |
| 9,380,568 | B2* | 6/2016 | Harrison | H04W 72/042 |
| 9,520,984 | B2* | 12/2016 | Yang | H04W 52/146 |
| 9,532,316 | B2 | 12/2016 | Han et al. | |
| 9,608,910 | B2* | 3/2017 | Han | H04L 47/12 |
| 2011/0235599 | A1 | 9/2011 | Nam et al. | |
| 2013/0064216 | A1* | 3/2013 | Gao | H04L 5/0016 370/330 |
| 2013/0094458 | A1* | 4/2013 | Sartori | H04W 72/042 370/329 |
| 2013/0107861 | A1* | 5/2013 | Cheng | H04W 72/042 370/331 |
| 2013/0114530 | A1* | 5/2013 | Chen | H04W 72/042 370/329 |
| 2013/0242882 | A1* | 9/2013 | Blankenship | H04W 72/042 370/329 |
| 2013/0242890 | A1* | 9/2013 | He | H04W 52/243 370/329 |
| 2013/0242904 | A1* | 9/2013 | Sartori | H04L 5/0053 370/329 |
| 2013/0308568 | A1* | 11/2013 | Chen | H04W 72/0406 370/329 |
| 2014/0126491 | A1* | 5/2014 | Ekpenyong | H04L 5/0055 370/329 |
| 2015/0023264 | A1* | 1/2015 | Tiirola | H04L 5/0094 370/329 |
| 2015/0341922 | A1 | 11/2015 | Han et al. | |

FOREIGN PATENT DOCUMENTS

| | | |
|---|---|---|
| KR | 1020150110484 A | 10/2015 |
| KR | 101680506 B1 | 11/2016 |
| KR | 1020160136472 A | 11/2016 |
| WO | WO-2014109873 A1 | 7/2014 |

OTHER PUBLICATIONS

3rd Generation Partnership Project; Technical Specification Group Radio Access Network; Evolved Universal Terrestrial Radio Access (E-UTRA); Physical layer procedures (Release 11), Feb. 2013, 173 pages.*

3rd Generation Partnership Project; Technical Specification Group Radio Access Network; Evolved Universal Terrestrial Radio Access (E-UTRA); Physical layer procedures (Release 11), Dec. 2013, 182 pages.*

"Chinese Application Serial No. 201380065649.5, Office Action dated Jun. 2, 2017", w/English Translation, 8 pgs.

"Chinese Application Serial No. 201380065649.5, Response filed Jul. 28, 2017 to Office Action dated Jun. 2, 2017", w/English Claims, 20 pgs.

"Korean Application Serial No. 10-2016-7032428, Office Action dated Jun. 1, 2017", w/English Claims, 10 pgs.

"Korean Application Serial No. 10-2016-7032428, Response Filed Jul. 31, 2017 to Office Action dated Jun. 1, 2017", w/English Claims, 13 pgs.

"U.S. Appl. No. 14/652,590, Notice of Allowability dated Aug. 31, 2016", 7 pgs.

"U.S. Appl. No. 14/652,590, Notice of Allowance dated Aug. 11, 2016", 9 pgs.

"European Application Serial No. 13871123.9, Extended European Search Report dated Aug. 8, 2016", 14 pgs.

"European Application Serial No. 13871123.9, Response filed Mar. 6, 2017 to Extended European Search Report dated Aug. 8, 2016", 19 pgs.

"International Application Serial No. PCT/US2013/075830, International Preliminary Report on Patentability dated Jul. 23, 2015", 8 pgs.

"International Application Serial No. PCT/US2013/075830, International Search Report dated Mar. 17, 2014", 3 pgs.

"International Application Serial No. PCT/US2013/075830, Written Opinion dated Mar. 27, 2014", 6 pgs.

"Korean Application Serial No. 10-2015-7015791, Office Action dated May 19, 2016", w/ English Translation, 8 pgs.

"Korean Application Serial No. 10-2015-7015791, Response filed Jul. 19, 2016 to Office Action dated May 19, 2016", W/ English Translation, 19 pgs.

"PUCCH Format 1a/1b Resources in Response to EPDCCH Detections", 3GPP Draft; RI-124383 A__N for EPDCCH, 3rd Generation Partnership Project (3GPP), Mobile Competence Centre, Samsung, Retrieved from the Internet: <http://www.3gpp.org/ftp/tsg_ran/WGI_RLI/TSGRI_70b/Docs/>, (Sep. 29, 2012), 3 pgs.

"PUCCH resource allocation for TDD EPDCCH", 3GPP Draft; RI-124927, 3rd Generation Partnership Project (3GPP), Mobile Competence Centre, Samsung, Retrieved from the Internet: <http://www.3gpp.org/ftp/tsg_ran/WGI_RLI/TSGRI_71/Docs/>, (Nov. 3, 2012), 4 pgs.

Ad-Hoc, Chairman, "Outcome of the Ad-Hoc session on PUCCH resource allocation for TDD", Nokia Siemens Networks R1-125382, (Nov. 2012).

Alcatel Lucent, et al., "Way forward on dynamic PUCCH resource allocation for FDD EPDCCH", R1-125303, 3GPP TSG RAN WG1 Meeting #71, (Nov. 2012), 1 pg.

Ericsson, "Remaining details of PUCCH resource allocation for EPDCCH", R1-124896, 3GPP TSG-RAN WG1 #71, (Nov. 2012), 1-3.

Huawei, et al., "PUCCH ACKNACK resource determination for EPDCCH", R1-125155, 3GPP TSG RAN WG1 Meeting #71, (Nov. 2012), 1-4.

Huawei, et al., "PUCCH ACKNACK resource determination for EPDCCH", R1-124082, 3GPP TSG RAN WG1 Meeting #70bis, (Oct. 2012), 1-5.

New Postcom, "Remaining aspects of PUCCH resource allocation for EPDCCH", R1-124798, 3GPP TSG-RAN WG1 #71, (Nov. 2012), 1-5.

"Chinese Application Serial No. 201380065649.5, Response filed Aug. 15, 2017 to Examiner Interview dated Aug. 14, 2017", w/English Claims, 19 pgs.

(56) References Cited

OTHER PUBLICATIONS

"Korean Application Serial No. 10-2016-7032428, Final Office Action dated Sep. 29, 2017", w/English Translation, 6 pgs.
"Korean Application Serial No. 10-2016-7032428, Response Filed Nov. 9, 2017 to Final Office Action dated Sep. 29, 2017", (W/ English Claims), 20 pgs.

* cited by examiner

| ACK/NACK Resource offset field in DCI format 1A/1B/1D/1/2A/2/2B/2C/2D | $\Delta_{ARO}$ |
|---|---|
| 0 | 0 |
| 1 | $-\sum_{i1=0}^{m-1} N_{ECCE,q,n-k_{i1}} - 2$ |
| 2 | $-\sum_{i1=m-\lceil m/3 \rceil}^{m-1} N_{ECCE,q,n-k_{i1}} - 1$ |
| 3 | 2 |

PUCCH RESOURCE COMPRESSION FOR EPDCCH IN TDD MODE

PRIORITY CLAIM

This application is a continuation of U.S. patent application Ser. No. 14/652,590, filed Jun. 16, 2015, which is a U.S. National Stage Application under 35 U.S.C. 371 from International Application No. PCT/US2013/075830, filed Dec. 17, 2013, which claims the benefit of priority to U.S. Provisional Patent Application Ser. No. 61/752,386, filed Jan. 14, 2013, each of which are incorporated herein by reference in their entirety.

TECHNICAL FIELD

Embodiments described herein relate generally to wireless networks and communications systems.

BACKGROUND

In LTE (Long Term Evolution) cellular systems, as set forth in the LTE specifications of the 3rd Generation Partnership Project (3GPP), terminals (where a terminal is referred to in LTE systems as user equipment or UE) connect to a base station (referred in LTE systems as an evolved Node B or eNB) that provides connectivity for the UE to other network entities of the LTE system that connect to an external network such as the internet. A major feature of LTE-Advanced (Long Term Evolution-Advanced or LTE-A), as part of the LTE specifications by the 3rd Generation Partnership Project (3GPP), is increased support for multi-user MIMO (multi-input multi-output) in which spatial multiplexing is used to provide separate downlink and uplink communications paths between an eNB and multiple UEs. As more UEs are scheduled per subframe for multi-user MIMO operations, the demand for physical downlink control channel (PDCCH) resources to provide scheduling for physical uplink resources is increased. The design of the PDCCH in Releases 8/9/10 of the LTE specification provides for a maximum PDCCH size of three OFDM (orthogonal frequency division multiplexing) symbols in a subframe which is inadequate for meeting this increased demand. Consequently, another control channel design, referred to as an enhanced PDCCH (EPDCCH), was introduced in Release 11 of the LTE specification.

In LTE, terminals that receive downlink data from the eNB may transmit acknowledgements (either positive or negative) back to the eNB over the physical uplink control channel (PUCCH) using an uplink resource allocated for that purpose by the eNB. In order to save signaling overhead, the current LTE specifications allow the eNB to signal the terminal what uplink resource to use for the PUCCH as a function of the structure of the information contained in the PDCCH or EPDCCH used to grant the terminal the downlink resource over which the terminal receives the downlink data that is to be acknowledged. Efficiently allocating uplink resources for the PUCCH via implicit signaling based upon the structure of the information contained in the EPDCCH is a concern of the present disclosure.

DETAILED DESCRIPTION

LTE uses a combination of forward error-correction coding and ARQ (automatic repeat request), referred to as hybrid ARQ. Hybrid ARQ uses forward error correction codes to correct some errors. When uncorrected errors are detected, the corrupted transmissions are discarded and the receiver requests retransmission. As the term is used herein, a hybrid-ARQ acknowledgement may either be a negative acknowledgement (NACK), signifying that a transmission error has occurred and that a retransmission is requested, or a positive acknowledgement (ACK) indicating that the transmission was received correctly.

When the eNB transmits data to a UE, the UE requires allocation of uplink resources by the eNB in order to respond with a hybrid-ARQ acknowledgement. Described herein is an EPDCCH configuration and techniques by which such uplink resources may be dynamically allocated to the UE in cases where the allocation of the downlink resources is over an EPDCCH.

LTE Air Interface

Figure 1:
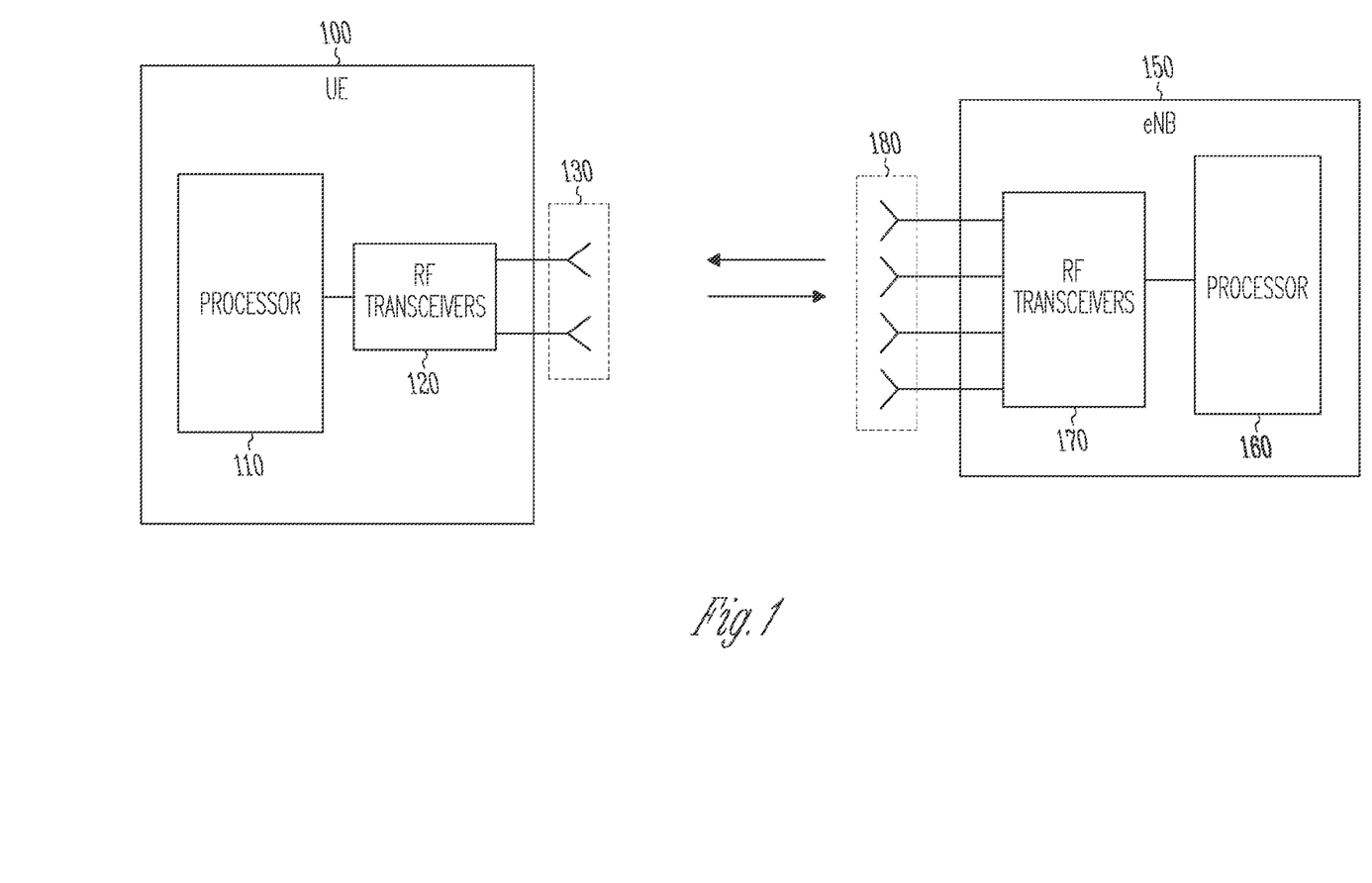
FIG. 1 illustrates a UE and an eNB in accordance with some embodiments.

FIG. 1 shows an example of a UE 100 and an eNB 150. The UE and eNB incorporate processing circuitries 110 and 160, respectively. The processing circuitry 110 in the UE is interfaced to a plurality of RF transceivers 120 that are each connected to one of a plurality of antennas 130. The processing circuitry 160 in the eNB is interfaced to a plurality of RF transceivers 170 that are each connected to one of a plurality of antennas 180. The illustrated components are intended to represent any type of hardware/software configuration for providing an LTE air interface and performing the processing functions as described herein.

The LTE air interface, also referred to as the radio access network (RAN), has a protocol architecture that may be basically described as follows. The topmost layer in the user plane is the packet data compression protocol (PDCP) layer which transmits and receives IP (internet protocol) packets. The topmost layer of the control plane in the access stratum between the UE and eNB is the radio resource control (RRC) layer. The PDCP layer communicates with the radio link control (RLC) layer via radio bearers to which IP packets are mapped. At the medium access control (MAC) layer, the connection to the RLC layer above is through logical channels, and the connection to the physical layer below is through transport channels. The MAC layer handles multiplexing/demultiplexing between the logical channels, hybrid-ARQ operations, and scheduling, the latter being performed solely at the eNodeB for both the uplink and the downlink. Data in a transport channel is organized into transport blocks, with respect to which the hybrid-ARQ function is performed at both the UE and eNB. The primary transport channels used for the transmission of data, the uplink shared channel (UL-SCH) and downlink shared channel (DL-SCH), are mapped to the physical uplink shared channel (PUSCH) and physical downlink shared channel (PDSCH), respectively, at the physical layer.

The physical layer of LTE is based upon orthogonal frequency division multiplexing (OFDM) for the downlink and a related technique, single carrier frequency division multiplexing (SC-FDM), for the uplink. In OFDM/SC- FDM, complex modulation symbols according to a modulation scheme such as QAM (quadrature amplitude modulation) are each individually mapped to a particular OFDM/SC-FDM subcarrier transmitted during an OFDM/SC-FDM symbol, referred to as a resource element (RE). An RE is the smallest physical resource in LTE. LTE also provides for MIMO (multi-input multi-output) operation where multiple layers of data are transmitted and received by multiple antennas and where each of the complex modulation symbols is mapped into one of the multiple transmission layers and then mapped to a particular antenna port. Each RE is then uniquely identified by the antenna port, sub-carrier position, and OFDM symbol index within a radio frame as explained below.

LTE transmissions in the time domain are organized into radio frames, each having a duration of 10 ms. Each radio frame consists of 10 subframes, and each sub-frame consists of two consecutive 0.5 ms slots. Each slot comprises six indexed OFDM symbols for an extended cyclic prefix and seven indexed OFDM symbols for a normal cyclic prefix. A group of resource elements corresponding to twelve consecutive subcarriers within a single slot is referred to as a resource block (RB) or, with reference to the physical layer, a physical resource block (PRB).

In the case of FDD (frequency division duplex) operation, where separate carrier frequencies are provided for uplink and downlink transmission, the above-described frame structure is applicable to both the uplink and downlink without modification. In TDD (time division duplex) operation, subframes are allocated for either uplink or downlink transmission with a special subframe occurring at the transition from downlink to uplink transmission (but not at the transition from uplink to downlink transmission). The eNB manages the allocation of uplink and downlink subframes within each radio frame during TDD operation.

LTE Control Signaling

A physical channel corresponds to the set of time-frequency resources used for transmission of a particular transport channel, and each transport channel is mapped to a corresponding physical channel. There are also physical control channels without a corresponding transport channel that are needed for supporting the transmission of the downlink and uplink transport channels. These include the physical downlink control channel (PDCCH) and the enhanced physical downlink control channel (EPDCCH), by which the eNB transmits downlink control information (DCI) to the UE, and the physical uplink control channel (PUCCH) that carries uplink control information (UCI) from the UE to the eNB. Insofar as is relevant to the present disclosure, the DCI carried by the PDCCH or EPDCCH may include scheduling information that allocates uplink and downlink resources to the UE, while the UCI carried by the PUCCH may include hybrid-ARQ acknowledgements for responding to transport blocks received by the UE.

Each downlink LTE subframe is divided into a control region at the beginning part of the subframe (i.e., the first two, three, or four OFDM symbols) and a data region which makes up the remainder of the subframe. The control region is reserved for downlink control channels such as the PDCCH, and PDCCHs are transmitted only in the control region of a subframe. EPDCCHs, on the other hand, are transmitted in the data region of a downlink subframe. In order to receive an EPDCCH, a terminal is configured with one or two sets of physical resource blocks over which EPDCCH transmission to that terminal may occur. Each set consists of two, four, or eight PRB pairs, and the two sets may be of different size. The resource-block pairs may be flexibly and non-contiguously located across the full downlink system bandwidth. A PRB pair belonging to an EPDCCH set but not used for EPDCCH transmission to a particular terminal in a certain subframe can be used for data transmission, either to the same terminal or to another terminal. An EPDCCH set may be configured as either a localized or distributed set. In a localized set, a single EPDCCH is mapped to one physical resource-block pair and to additional PRB pairs only as needed. In a distributed set, a single EPDCCH is distributed over multiple PRB pairs. Also, in the case of multi-antenna transmission by the eNB, an EPDCCH is transmitted using DMRS (demodulation reference signal) based antenna pre-coding. A PDCCH, in contrast, is transmitted by the eNB using CRS (cell-specific reference signal) based transmit diversity.

The mapping of PDCCHs to resource elements is done with a particular structure based on control channel elements (CCEs), where a CCE is a set of thirty-six contiguous resource elements. The number of CCEs required for a certain PDCCH depends on the size of the DCI being carried. CCEs are numbered (i.e., indexed) according to their time-frequency location in the control region subframe so that each PDCCH in a subframe is uniquely identified by the indexes of the CCEs that make it up. EPDCCHs are constructed from what are called enhanced control channel elements (ECCEs) as opposed to the CCEs used for construction a PDCCH. ECCEs are also indexed according to their time-frequency location in the subframe. Unlike the indexing of CCEs, however, the indexing of ECCEs is terminal-specific.

Each PDCCH or EPDCCH may be addressed to a specific UE by appending a UE-specific CRC (cyclic redundancy check) to the PDCCH or EPDCCH, which also serves for error detection. Thus, a UE detects a PDCCH intended for it by performing the CRC calculation and seeing whether the calculation checks. The CRC is made UE-specific by including the UE's (or UEs') radio network temporary identifier (RNTI) in the CRC calculation. LTE also defines search spaces to limit the set of CCEs or ECCEs that the UE needs to monitor in order to detect a PDCCH or EPDCCH intended for it.

If a UE has already been allocated PUSCH resources in an uplink subframe in which control signaling such as a hybrid-ARQ acknowledgement is to be sent, the control signaling can be time multiplexed with data in the PUSCH. Otherwise, the PUCCH is used. Each PUCCH resource is made up of one resource block within each of two slots of an uplink subframe. Control signaling from multiple UEs can be multiplexed into a single PUCCH region with a combination of time-domain and frequency-domain code division multiplexing. A symbol constituting the control signaling is multiplied by an orthogonal cover sequence to effect spreading in time, and the resulting symbols are then used to modulate a phase rotated (corresponding to a cyclic shift in the time domain) length-12 reference signal sequence in the frequency domain to effect spreading in frequency. The resource used by a PUCCH is thus not only specified in the time-frequency domain by its assigned resource blocks, but also by the cyclic shift and orthogonal cover sequence applied. By assigning different cyclic shifts and orthogonal cover sequences to different UEs, PUCCHs may be transmitted by different UEs using the same time-frequency resource.

A hybrid-ARQ acknowledgement is sent via a single BPSK or QPSK (binary or quadrature phase shift keying) symbol that is code division multiplexed in a PUCCH in the manner just described to spread the symbol over the pair of resource blocks in what is referred to as a Format 1 PUCCH. A PUCCH format 1 resource is represented by a PUCCH index, $n_{PUCCH}^{(1)}$, from which the resource block pair, the phase rotation, and the orthogonal cover sequence are derived in the manner described by the LTE specifications (See 3GPP TS 36.211).

To provide transmit diversity for the PUCCH, the PUCCH may also be transmitted using two antenna ports using a technique called Spatial Orthogonal Resource Transmit Diversity (SORTD). In SORTD, the same PUCCH is transmitted using two different PUCCH indices.

Downlink scheduling assignments to a UE apply to the same subframe in which they are transmitted. In the situation where a UE receives a PDSCH allocation in a particular subframe, the UE needs to send a hybrid-ARQ acknowledgement in a designated subsequent subframe. The UE may use a previously allocated uplink resource in that subsequent subframe (i.e., either a PUSCH or PUCCH resource). Otherwise, for a hybrid-ARQ acknowledgement in a format 1 PUCCH, the eNB allocates the uplink resource in the same PDCCH that allocates the PDSCH containing the data which is to be acknowledged.

In the case of FDD, there is a one-to-one correspondence between downlink subframes transmitting data and uplink subframes transmitting hybrid-ARQ acknowledgements for that data. In TDD, on the other hand, an asymmetric allocation of uplink and downlink subframes may necessitate that a single uplink subframe be used to acknowledge multiple downlink subframes, the latter group of downlink subframes being referred to as a bundling window. Although, in principle, multiple PUCCHs could be used by a terminal to acknowledge multiple downlink subframes, current LTE specifications dictate that there is only one PUCCH per terminal per subframe. If a terminal needs to send more acknowledgements than there are bits allocated for in a PUCCH (two bits for a Format 1 PUCCH), a technique called resource selection (a.k.a., channel selection) is employed. In this technique, the eNB assigns multiple PUCCH resources to the terminal for acknowledging multiple downlink transmissions in a subsequent uplink subframe. Although all of these PUCCH resources are reserved and cannot be used for other purposes, the terminal selects only one of the reserved PUCCH resources to actually transmit the PUCCH. Which of the reserved PUCCH resources is selected by the terminal constitutes additional information for the eNB that may be interpreted as a particular pattern of positive and negative acknowledgements for the multiple downlink subframes.

PUCCH Mapping Schemes for EPDCCH

To reduce signaling overhead, the eNB implicitly signals the resource for a format 1a/b PUCCH that is to be used to acknowledge one or more PDSCH transmissions by including that information in the structure of the PDCCH or EPDCCH that allocates the PDSCH to the terminal. Specifically, the PUCCH resource is a function of the lowest index of the CCE or ECCE used to construct the PDCCH that schedules the PDSCH transmission.

For PDCCH-scheduled downlink transmissions, the resource index to use for a hybrid-ARQ acknowledgement is given as a function of the first CCE in the PDCCH used to schedule the downlink transmission to the terminal. There is then no need to explicitly include information about the PUCCH resources in the downlink scheduling assignment. Since hybrid-ARQ acknowledgements are transmitted a fixed time after the reception of the PDSCH, the eNB knows when to expect a hybrid-ARQ on the assigned PUCCH resource.

For EPDCCH-scheduled transmissions, however, the index of the first ECCE in the EPDCCH cannot be used alone. Since the ECCE indexing is configured per terminal and is terminal-specific, two different terminals with EDPCCHs on different PRBs may have the same number of the first ECCE in the EPDCCH. The current LTE specifications therefore provide an acknowledgement resource offset (ARO) field in the EPDCCH that enables the eNB to adjust the index of the PUCCH resource calculated by the terminal based upon the lowest ECCE index of the EPDCCH. The eNB uses the ARO to avoid collisions between multiple PUCCH resources assigned to a terminal or between the PUCCH resources assigned to different terminals. The eNB also configures an additional parameter, $N_{PUCCH,q}^{(e1)}$, via RRC signaling that is used in the calculation of the PUCCH resource index by the terminal. The $N_{PUCCH,q}^{(e1)}$ parameter is an offset configured by the eNB to separate PUCCH resource indices computed for a particular EPDCCH set q from those computed for other EPDCCH sets. Different EPDCCH sets assigned to different terminals (or assigned to the same terminal) may thus be assigned PUCCH resources separated in the PUCCH resource index space by the value of $N_{PUCCH,q}^{(e1)}$.

For FDD mode, a format 1a/b PUCCH resource for an EPDCCH may be calculated as:

$$n_{PUCCH}^{(1)} = n_{ECCE,q} + \Delta_{ARO} + N_{PUCCH,q}^{(e1)}$$

for an EPDCCH set q configured for distributed transmission to the UE and as $$n_{PUCCH}^{(1)} = \left\lceil \frac{n_{ECCE,q}}{N_{RB}^{ECCE,q}} \right\rceil \cdot N_{RB}^{ECCE,q} + n' + \Delta_{ARO} + N_{PUCCH,q}^{(e1)}$$

for an EPDCCH set q configured for localized transmission to the UE where $n_{ECCE,q}$ is the lowest ECCE index used to construct the EPDCCH, $N_{PUCCH,q}^{(e1)}$ is an offset configured by the eNB to separate PUCCH resource indices computed for EPDCCH set q from those computed for other EPDCCH sets, $\Delta_{ARO}$ is the value of the ARO contained in the DCI of the EPDCCH, $N_{RB}^{ECCE,q}$ is the number of ECCEs in a resource block, and n' is a number between 0 and 3 determined from the DMRS (demodulation reference signal) antenna port used for localized EPDCCH transmission. If the PUCCH is to be transmitted using SORTD, the calculated resource index is used for one antenna port and incremented by one for the other antenna port. By appropriate setting of the ARO and $N_{PUCCH,q}^{(e1)}$, the eNB attempts to avoid PUCCH resource indices assigned to different EPDCCHs. For FDD, the ARO may be selected by the eNB from the following set: $\{-2, -1, 0, 2\}$. By including both 1 and 2 (or −2) in the set, the eNB is able to separate PUCCH resource indices in the cases where SORTD is employed or not employed to transmit the PUCCH.

For TDD mode, the situation is complicated by the fact that EPDCCHs belonging to a particular set configured for a terminal may occur in multiple subframes belonging to a bundling window that must be acknowledged by a single PUCCH transmission. To separate the PUCCH resources for the different subframes of bundling window in PUCCH resource index space, the calculations given above for FDD mode may be modified to include a term that includes the sum of the number of ECCEs in the EPDCCH set configured for the terminal in each subframe of the bundling window. The PUCCH resource may then be computed as:

$$n_{PUCCH}^{(1)} = n_{ECCE,q} + \sum_{i=0}^{m-1} N_{ECCE,q,i} + \Delta_{ARO} + N_{PUCCH,q}^{(e1)}$$

for an EPDCCH set q configured for distributed transmission to the UE and as $$n_{PUCCH}^{(1)} = \left\lfloor \frac{n_{ECCE,q}}{N_{RB}^{ECCE,q}} \right\rfloor \cdot N_{RB}^{ECCE,q} + \sum_{i=0}^{m-1} N_{ECCE,q,i} + n' + \Delta_{ARO} + N_{PUCCH,q}^{(e1)}$$

for an EPDCCH set q configured for localized transmission to the UE where $n_{ECCE,q}$ is the lowest ECCE index used to construct the EPDCCH transmitted in subframe m, $N_{PUCCH,q}^{(e1)}$ is an offset configured by the eNB to separate PUCCH resource indices computed for EPDCCH set q from those computed for other EPDCCH sets, $\Delta_{ARO}$ is the value of the ARO contained in the DCI of the EPDCCH, $N_{ECCE,q,i}$ is the number of ECCEs configured for EPDCCH set q in a subframe with relative index i, $N_{RB}^{ECCE,q}$ is the number of ECCEs in a resource block, and n' is a number between 0 and 3 determined from the DMRS (demodulation reference signal) antenna port used for EPDCCH transmission in subframe m. Again, if the PUCCH is to be transmitted using SORTD, the calculated resource index is used for one antenna port and incremented by one for the other antenna port.

Figure 2:
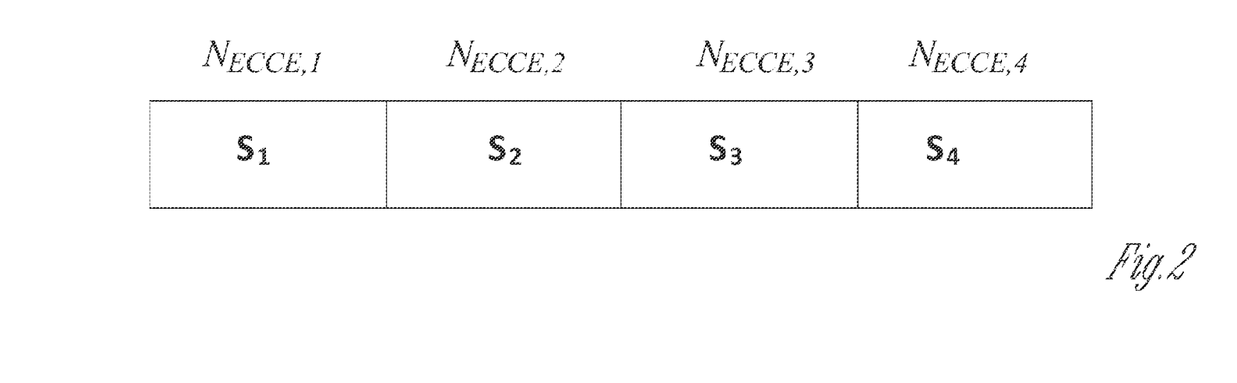
FIG. 2 illustrates a bundling window and the PUCCH resource indices for the subframes.

The same set of permissible ARO values used for FDD mode, where the ARO value is selected from $\{-2, -1, 0, 2\}$, could also be used for TDD mode. A problem with the way of allocating PUCCH resources in TDD mode as set forth above, however, is that PUCCH resources are effectively reserved for subframes of the bundling window whether or not ECCEs are actually utilized in EPDCCHs for those subframes. FIG. 2 illustrates a bundling window consisting of subframes $S_1$ through $S_4$. The subscripts refer to their relative indices within the bundling window so that $S_1$ is the earliest subframe and $S_4$ is the latest subframe. For each subframe $S_i$, $N_{ECCE,i}$ is the number of ECCEs configured for EPDCCH in that subframe. The PUCCH resource index calculation for TDD mode as given above with no ARO compensation would mean that the PUCCH resource index calculated for subframe $S_4$ would be calculated in a manner that reserves PUCCH resources for subframes $S_1$ through $S_3$ regardless of whether EPDCCH transmissions actually occur in those subframes. That is, the sum of $N_{ECCE,1}$ through $N_{ECCE,4}$ is reserved in the PUCCH resource index space. It is desirable to minimize the amount of resources reserved for PUCCH transmission because those resources can be allocated instead to PUSCH transmissions to increase throughput.

A way to improve the situation is to provide permissible values for the ARO that effectively compress the PUCCH resources. That is, the eNB is able to signal the terminal with an appropriate ARO that compresses the region in PUCCH resource index space that would otherwise be reserved for the subframes of a bundling window. Accordingly, in one embodiment, the value of the ARO may be selected from the following set of elements:

$$\left\{ -\sum_{i=0}^{m-1} N_{ECCE,q,i} - 2, -\sum_{i=0}^{m-1} N_{ECCE,q,i} - 1, 0, 2 \right\}.$$

Figure 3:
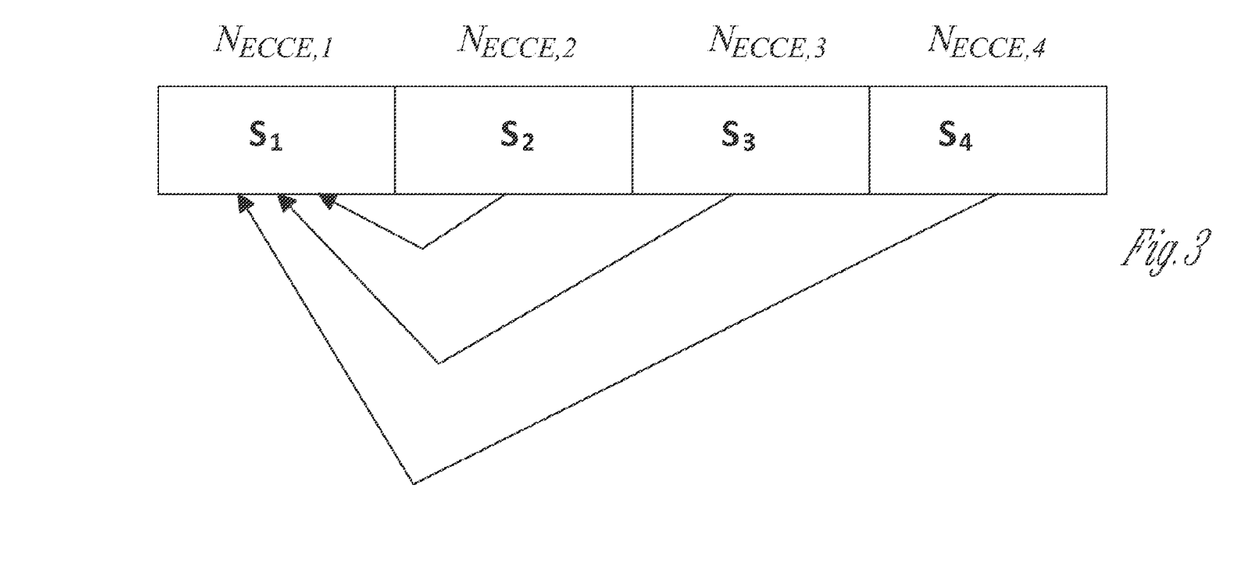
FIG. 3 illustrates a bundling where PUCCH resource calculation with a large negative value for the ARO is used to shift the PUCCH resource index range for subframes $S_2$ to $S_4$ to the range of subframe $S_1$.

The large negative values represented by the first two elements of the set value can be used to shift the PUCCH resource index for a subframe in the bundling window to a range used for acknowledging PDSCH transmissions in the earliest subframe of the bundling window. For the earliest subframe of the bundling window, the large negative values are not needed, and the ARO could be selected from the same set used for FDD mode: $\{-2, -1, 0, 2\}$ where the nested property can hold. FIG. 3 illustrates the bundling window consisting of subframes $S_1$ through $S_4$ where PUCCH resource calculation with a large negative values the ARO can be used to shift the PUCCH resource index range for subframes $S_2$ to $S_4$ to the range of subframe $S_1$.

Figure 4:
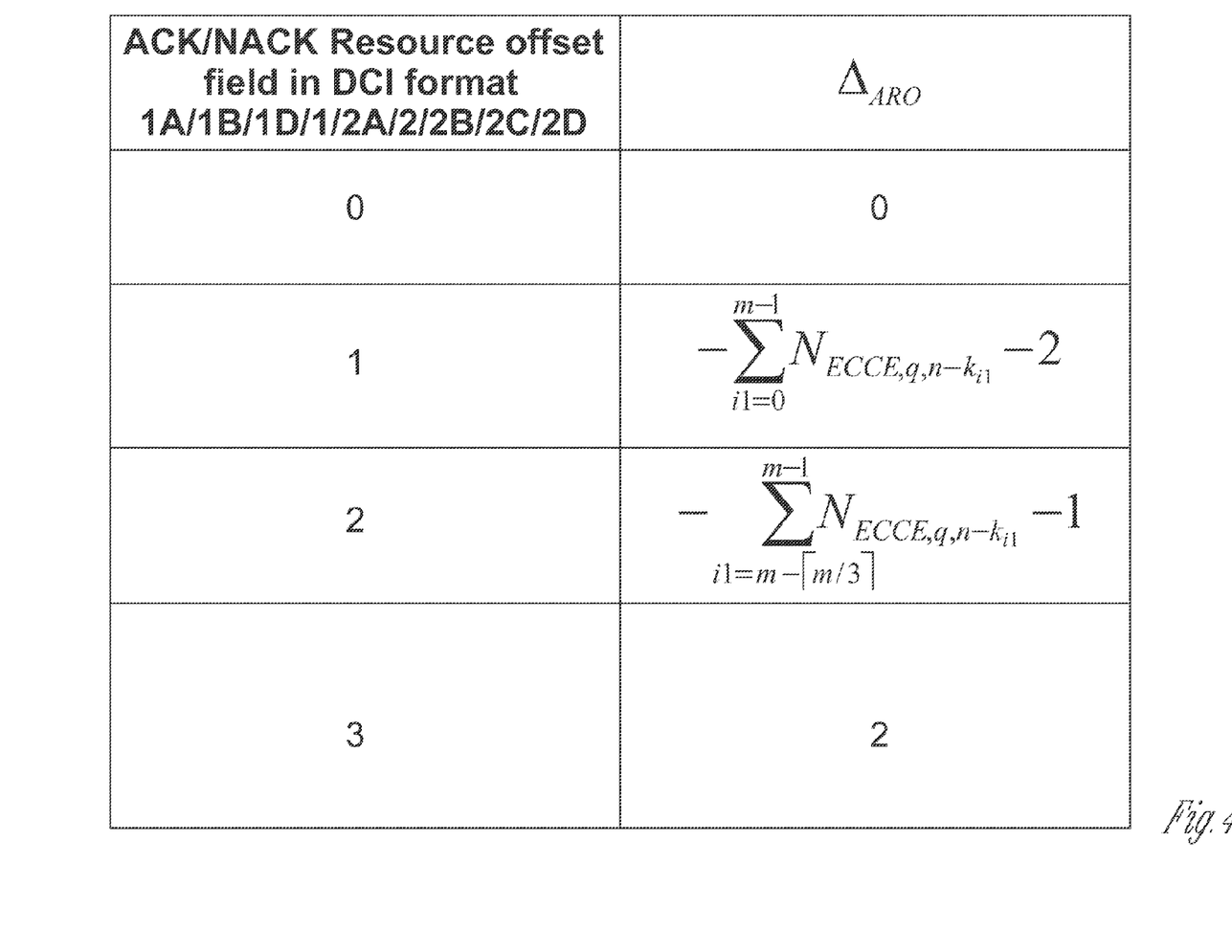
FIG. 4 is a table that illustrates the mapping of a two-bit ARO field to ARO values.

FIG. 4 is a table that illustrates an embodiment as just described. For a downlink subframe having a relative index m between 1 and M−1 with M being the number of subframes in the bundling window and with m=0 representing the earliest subframe, the value of the two-bit ARO field in the DCI of an EPDCCH is interpreted to correspond to one of the values in the set of elements made up of $$\left\{ -\sum_{i=0}^{m-1} N_{ECCE,q,i} - 2, -\sum_{i=0}^{m-1} N_{ECCE,q,i} - 1, 0, 2 \right\}$$

as indicated by the table in FIG. 4. In one embodiment, if m=0, the value of the two-bit ARO field corresponds to one of the following set of elements: $\{-2, -1, 0, 2\}$.

In another embodiment, for a downlink subframe having a relative index m>0, the value of the ARO is selected from a set that includes the following set of elements:

$$\left\{ -\sum_{i=0}^{m-1} N_{ECCE,q,i} + \alpha, -\sum_{i=0}^{m-1} N_{ECCE,q,i} + \beta \right\}$$

where α and β are specified integers. In another embodiment, for a downlink subframe having a relative index m>0, the value of the ARO is selected from the following set of elements:

$$\left\{ -\sum_{i=0}^{m-1} N_{ECCE,q,i} + \alpha, -\sum_{i=0}^{m-1} N_{ECCE,q,i} + \beta, 0, 2 \right\}$$

where α and β are specified integers. In either of the above embodiments, the integer values may be selected as α=0 and β=2.

Additional Notes and Examples

In Example 1, a method for operating an evolved Node B (eNB) an LTE (Long Term Evolution) network, comprises: via an enhanced physical downlink control channel (EPDCCH) made up of indexed enhanced control channel elements (ECCEs), transmitting downlink control information (DCI) to a UE that grants a physical downlink shared channel (PDSCH) resource for a downlink subframe belonging to a bundling window and assigning a physical uplink control channel (PUCCH) resource index to the UE for acknowledging the PDSCH transmission calculated as a function of the lowest index of the ECCEs used to construct the EPDCCH added to the number of ECCEs in EPDCCHs configured for the UE in earlier subframes that belong to the bundling window and added to one of two specified integer values; and, transmitting an acknowledgment resource offset (ARO) in an ARO field of the DCI that instructs the UE to shift the PUCCH resource index by an amount equal to the value of the ARO and wherein, except for the earliest subframe of the bundling window, values for the ARO are selected from a group that includes a value that shifts the PUCCH resource index to a range used for acknowledging PDSCH transmissions in the earliest subframe of the bundling window.

Example 2, a method for operating a UE in TDD) mode comprises: receiving downlink control information (DCI) from an eNB via an enhanced physical downlink control channel (EPDCCH) made up of indexed enhanced control channel elements (ECCEs) that grants a physical downlink shared channel (PDSCH) resource for a downlink subframe belonging to a bundling window, calculating a physical uplink control channel (PUCCH) resource index for acknowledging the PDSCH transmission as a function of the lowest index of the ECCEs used to construct the EPDCCH added to the number of ECCEs in EPDCCHs configured for the UE in earlier subframes that belong to the bundling window; and, interpreting the of value an acknowledgment resource offset (ARO) field of the DCI as corresponding to an ARO value that shifts the PUCCH resource index by an amount equal to the value of the ARO and wherein, except for the earliest subframe of the bundling window, values for the ARO corresponding to the ARO field are selected from a group that includes a value that shifts the PUCCH resource index to a range used for acknowledging PDSCH transmissions in the earliest subframe of the bundling window.

In Example 3, an eNB comprises processing circuitry and a radio interface for communicating with user equipments (UEs), wherein the processing circuitry when operating in time division duplex (TDD) mode is to perform the method of Example 1.

In Example 4, a UE comprises processing circuitry and a radio interface for communicating with an eNB, wherein the processing circuitry when operating in time division duplex (TDD) mode is to perform the method of Example 2.

In Example 5, the subject matter of any of Examples 1 through 4 may optionally include: wherein, for a downlink subframe having a relative index m between 0 and M−1 with M being the number of subframes in the bundling window and with m=0 representing the earliest subframe, the PUCCH resource index $n_{PUCCH}^{(1)}$ is used to determine the resource block pair, cyclic shift, and orthogonal cover sequence of a format 1 PUCCH and is computed as:

$$n_{PUCCH}^{(1)} = n_{ECCE,q} + \sum_{i=0}^{m-1} N_{ECCE,q,i} + \Delta_{ARO} + N_{PUCCH,q}^{(e1)}$$

for an EPDCCH set q configured for distributed transmission to the UE and $$n_{PUCCH}^{(1)} = \left\lfloor \frac{n_{ECCE,q}}{N_{RB}^{ECCE,q}} \right\rfloor \cdot N_{RB}^{ECCE,q} + \sum_{i=0}^{m-1} N_{ECCE,q,i} + n' + \Delta_{ARO} + N_{PUCCH,q}^{(e1)}$$

for an EPDCCH set q configured for localized transmission to the UE where $n_{ECCE,q}$ is the lowest ECCE index used to construct the EPDCCH transmitted in subframe m, $N_{PUCCH,q}^{(e1)}$ is an offset configured by the eNB to separate PUCCH resource indices computed for EPDCCH set q from those computed for other EPDCCH sets, $\Delta_{ARO}$ is the value of the ARO contained in the DCI, $N_{ECCE,q,i}$ is the number of ECCEs in EPDCCH set q configured for the UE in a subframe with relative index i, $N_{RB}^{ECCE,q}$ is the number of ECCEs in a resource block, and n' is a number between 0 and 3 determined from the DMRS (demodulation reference signal) antenna port used for EPDCCH transmission in subframe m.

In Example 6, the subject matter of Example 5 may optionally include: wherein if the PUCCH is to be transmitted over two antenna ports using spatial orthogonal-resource transmit diversity (SORTD), the PUCCH resource index $n_{PUCCH}^{(1)}$ is computed for one antenna port and incremented by 1 for the other antenna port.

In Example 7, the subject matter of Example 5 may optionally include: wherein, for m>0, the value of the ARO is selected from the following set of elements:

$$\left\{ -\sum_{i=0}^{m-1} N_{ECCE,q,i} - 2, -\sum_{i=0}^{m-1} N_{ECCE,q,i} - 1, 0, 2 \right\}.$$

In Example 8, the subject matter of Example 5 may optionally include: wherein, for m=0, the value of the ARO is selected from the following set of elements: $\{-2, -1, 0, 2\}$.

In Example 9, the subject matter of Example 5 may optionally include: wherein, for m>0, the value of the ARO is selected from a set that includes the following set of elements:

$$\left\{ -\sum_{i=0}^{m-1} N_{ECCE,q,i} + \alpha, -\sum_{i=0}^{m-1} N_{ECCE,q,i} + \beta \right\}$$

where α and β are specified integers.

In Example 10, the subject matter of Example 5 may optionally include: wherein, for m>0, the value of the ARO is selected from the following set of elements:

$$\left\{ -\sum_{i=0}^{m-1} N_{ECCE,q,i} + \alpha, -\sum_{i=0}^{m-1} N_{ECCE,q,i} + \beta, 0, 2 \right\}$$

where α and β are specified integers.

In Example 11, the subject matter of Example 9 or 10 may optionally include: wherein α=0 and β=2.

In Example 12, the subject matters of any of Examples 1 through 11 may optionally include: wherein the ARO field is a two-bit field.

In Example 13, the subject matters of any of Examples 1 through 12 may optionally include: wherein acknowledgements are received from the UE for PDSCH transmissions in subframes of the bundling window in a PUCCH of a subsequent uplink subframe where the PUCCH contains uplink control information (UCI) with a two-bit acknowledgement field.

In Example 14, the subject matter of Example 13 may optionally include: wherein the value of the two-bit acknowledgment field in the UCI is combined with the PUCCH resource selected by the UE to transmit the PUCCH from among the PUCCH resource indices computed by the UE for PDSCH transmissions in subframes of the bundling window to derive up to four separate acknowledgements.

In Example 15, a machine-readable medium contains instructions that, when executed, cause a machine to carry out the methods according to any of Examples 1 through 14.

In Example 16, a system comprises means for carrying out the methods according to any of Examples 1 through 14.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as eNode-B.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A user equipment (UE) comprising:
processing circuitry and receiver circuitry to
receive downlink control information (DCI) on an enhanced physical downlink control channel (EPDCCH) that includes indexed enhanced control channel elements (ECCEs); the DCI to schedule a physical downlink shared channel (PDSCH) resource for a downlink subframe;
receive an acknowledgment resource offset (ARO) value in an ARO field of the DCI that instructs the UE to shift the PUCCH resource index by an amount equal to the value of the ARO; and
determine a physical uplink control channel (PUCCH) resource index to acknowledge PDSCH transmissions as a function of the lowest ECCE index used to construct the EPDCCH, wherein the value of the ARO field corresponds to an ARO value to shift the PUCCH resource index to a range used for acknowledging PDSCH transmissions in the earliest subframe of a bundling window, wherein, for a downlink subframe having a relative index m between 0 and M−1 with M being the number of subframes in the bundling window and with m=0 representing the earliest subframe, the PUCCH resource index $n_{PUCCH}^{(1)}$ is used to determine the resource block pair, cyclic shift, and orthogonal cover sequence of a format 1 PUCCH and is computed as:

$$n_{PUCCH}^{(1)} = n_{ECCE,q} + \sum_{i=0}^{m-1} N_{ECCE,q,i} + \Delta_{ARO} + N_{PUCCH,q}^{(e1)}.$$

for an EPDCCH set q configured for distributed transmission to the UE and $$n_{PUCCH}^{(1)} = \left\lfloor \frac{n_{ECCE,q}}{N_{RB}^{ECCE,q}} \right\rfloor \cdot N_{RB}^{ECCE,q} + \sum_{i=0}^{m-1} N_{ECCE,q,i} + n' + \Delta_{ARO} + N_{PUCCH,q}^{(e1)}$$

for an EPDCCH set q configured for localized transmission to the UE where $n_{ECCE,q}$ is the lowest ECCE index used to construct the EPDCCH transmitted in subframe m, $N_{PUCCH,q}^{(e1)}$ is an offset configured by the eNB to separate PUCCH resource indices computed for EPDCCH set q from those computed for other EPDCCH sets $\Delta_{ARO}$ is the value of the ARO contained in the DCI, $N_{ECCE,q,i}$ is the number of ECCEs in EPDCCH set q configured for the UE in a subframe with relative index i, $N_{RB}^{ECCE,q}$ is the number of ECCEs in a resource block, and n' is determined from the antenna port used for EPDCCH transmission in subframe m.

2. The LIE of claim 1 wherein, for m>0, the value of the ARO field corresponds to an ARO value selected from the following set of elements:

$$\left\{ -\sum_{i=0}^{m-1} N_{ECCE,q,i} - 2, -\sum_{i=0}^{m-1} N_{ECCE,q,i} - 1, 0, 2 \right\}.$$

3. The LIE of claim 1 wherein, for m=0, the value of the ARO field corresponds to an ARO value selected from the following set of elements: {−2, −1, 0, 2}.

4. The UE of claim 1, wherein the PUCCH resource index is calculated further based on EPDCCH added to the number of ECCEs in EPDCCHs derived for the UE and added to an integer value determined from the antenna port used for EPDCCH transmission.

5. An evolved Node B (eNB) comprising processing circuitry and a transceiver configured to:
transmit downlink control information (Do) on an enhanced physical downlink control channel (EPDCCH) that includes indexed enhanced control channel elements (ECCEs), the DCI to schedule a physical downlink shared channel (PDSCH) resource for a downlink subframe;
assign a physical uplink control channel (PUCCH) resource index to a user equipment (UE) for acknowledging the PDSCH transmissions as a function of the lowest ECCE index used to construct the EPDCCH; and
transmit an acknowledgment resource offset (ARO) in an ARO field of the DCI that instructs the UE to shift the PUCCH resource index by an amount equal to the value of the ARO,
wherein the value of the ARO field corresponds to an ARO value to shift the PUCCH resource index to a range used for acknowledging PDSCH transmissions in the earliest subframe of a bundling window, wherein, for a downlink subframe having a relative index m between 0 and M−1 with M being the number of subframes in the bundling window and with m=0 representing the earliest subframe, the PUCCH resource index $n_{PUCCH}^{(1)}$ is used to determine the resource block pair, cyclic shift, and orthogonal cover sequence of a format 1 PUCCH and is computed as:

$$n_{PUCCH}^{(1)} = n_{ECCE,q} + \sum_{i=0}^{m-1} N_{ECCE,q,i} + \Delta_{ARO} + N_{PUCCH,q}^{(e1)}.$$

for an EPDCCH set q configured for distributed transmission to the UE and $$n_{PUCCH}^{(1)} = \left\lfloor \frac{n_{ECCE,q}}{N_{RB}^{ECCE,q}} \right\rfloor \cdot N_{RB}^{ECCE,q} + \sum_{i=0}^{m-1} N_{ECCE,q,i} + n' + \Delta_{ARO} + N_{PUCCH,q}^{(e1)}$$

for an EPDCCH set q configured for localized transmission to the UE where $n_{ECCE,q}$ is the lowest ECCE index used to construct the EPDCCH transmitted in subframe m, $N_{PUCCH,q}^{(e1)}$ is an offset configured by the eNB to separate PUCCH resource indices computed for EPDCCH set q from those computed for other EPDCCH sets, $\Delta_{ARO}$ is the value of the ARO contained in the DCI, $N_{ECCE,q,i}$ is the number of ECCEs in EPDCCH set q configured for the UE in a subframe with relative index i, $N_{RB}^{ECCE,q}$ is the number of ECCEs in a resource block, and n' is determined from the antenna port used for EPDCCH transmission in subframe m.

6. The eNB of claim 5 wherein, for m>0, the value of the ARO field corresponds to an ARO value selected from the following set of elements:

$$\left\{ -\sum_{i=0}^{m-1} N_{ECCE,q,i} - 2, -\sum_{i=0}^{m-1} N_{ECCE,q,i} - 1, 0, 2 \right\}.$$

7. The eNB of claim 5 wherein, for m=0, the value of the ARO field corresponds to an ARO value selected from the following set of elements: {−2, −1, 0, 2}.

8. The eNB of claim 5, wherein the PUCCH resource index is calculated further based on EPDCCH added to the number of ECCEs in EPDCCHs derived for the UE and added to an integer value determined from the antenna port used for EPDCCH transmission.

9. A non-transitory computer-readable medium including instructions that, when executed on processing circuitry of a user equipment (UE), cause the UE to:
  receive downlink control information (DCI) on an enhanced physical downlink control channel (EPDCCH) that includes indexed enhanced control channel elements (ECCEs), the DCI to schedule a physical downlink shared channel (PDSCH) resource for a downlink subframe;
  receive an acknowledgment resource offset (ARO) value in an ARO field of the DCI that instructs the UE to shift the PUCCH resource index by an amount equal to the value of the ARO; and
  determine a physical uplink control channel (PUCCH) resource index to acknowledge PDSCH transmissions as a function of the lowest ECCE index used to construct the EPDCCH, wherein the value of the ARO field corresponds to an ARO value to shift the PUCCH resource index to a range used for acknowledging PDSCH transmissions in the earliest subframe of a bundling window, wherein, for a downlink subframe having a relative index in between 0 and M−1 with M being the number of subframes in the bundling window and with m=0 representing the earliest subframe, the PUCCH resource index $n_{PUCCH}^{(1)}$ is used to determine the resource block pair, cyclic shift, and orthogonal cover sequence of a format 1 PUCCH and is computed as:

$$n_{PUCCH}^{(1)} = n_{ECCE,q} + \sum_{i=0}^{m-1} N_{ECCE,q,i} + \Delta_{ARO} + N_{PUCCH,q}^{(e1)}$$

for an EPDCCH set q configured for distributed transmission to the UE and $$n_{PUCCH}^{(1)} = \left\lfloor \frac{n_{ECCE,q}}{N_{RB}^{ECCE,q}} \right\rfloor \cdot N_{RB}^{ECCE,q} + \sum_{i=0}^{m-1} N_{ECCE,q,i} + n' + \Delta_{ARO} + N_{PUCCH,q}^{(e1)}$$

for an EPDCCH set q configured for localized transmission to the UE where $n_{ECCE,q}$ is the lowest ECCE index used to construct the EPDCCH transmitted in subframe m, $N_{PUCCH,q}^{(e1)}$ is an offset configured by the eNB to separate PUCCH resource indices computed for EPDCCH set q from those computed for other EPDCCH sets, $\Delta_{ARO}$ is the value of the ARO contained in the DCI, $N_{ECCE,q,i}$ is the number of ECCEs in EPDCCH set q configured for the UE in a subframe with relative index i, $N_{RB}^{ECCE,q}$ is the number of ECCEs in a resource block, and n is determined from the antenna port used for EPDCCH transmission in subframe m.

10. The non-transitory computer-readable medium of claim 9 wherein, for m>0, the value of the ARO field corresponds to an ARO value selected from the following set of elements:

$$\left\{ -\sum_{i=0}^{m-1} N_{ECCE,q,i} - 2, -\sum_{i=0}^{m-1} N_{ECCE,q,i} - 1, 0, 2 \right\}.$$

11. The non-transitory computer-readable medium of claim 9 wherein, for m=0, the value of the ARO field corresponds to an ARO value selected from the following set of elements: {−2, −1, 0, 2}.

12. The non-transitory computer-readable medium of claim 9, wherein the PUCCH resource index is calculated further based on EPDCCH added to the number of ECCEs in EPDCCHs derived for the UE and added to an integer value determined from the antenna port used for EPDCCH transmission.

* * * * *

UNITED STATES PATENT AND TRADEMARK OFFICE
CERTIFICATE OF CORRECTION

PATENT NO. : 9,872,282 B2
APPLICATION NO. : 15/386404
DATED : January 16, 2018
INVENTOR(S) : Han et al.

Page 1 of 1

It is certified that error appears in the above-identified patent and that said Letters Patent is hereby corrected as shown below:

In the Claims

In Column 13, Line 50, in Claim 1, delete "sets" and insert --sets,-- therefor
In Column 13, Line 56, in Claim 2, delete "LIE" and insert --UE-- therefor
In Column 13, Line 65, in Claim 3, delete "LIE" and insert --UE-- therefor
In Column 14, Line 8, in Claim 5, delete "(Do)" and insert --(DCI)-- therefor
In Column 15, Line 28, in Claim 9, delete "in" and insert --m-- therefor Signed and Sealed this
Fourteenth Day of April, 2020

Andrei Iancu
*Director of the United States Patent and Trademark Office*